UNITED STATES PATENT OFFICE.

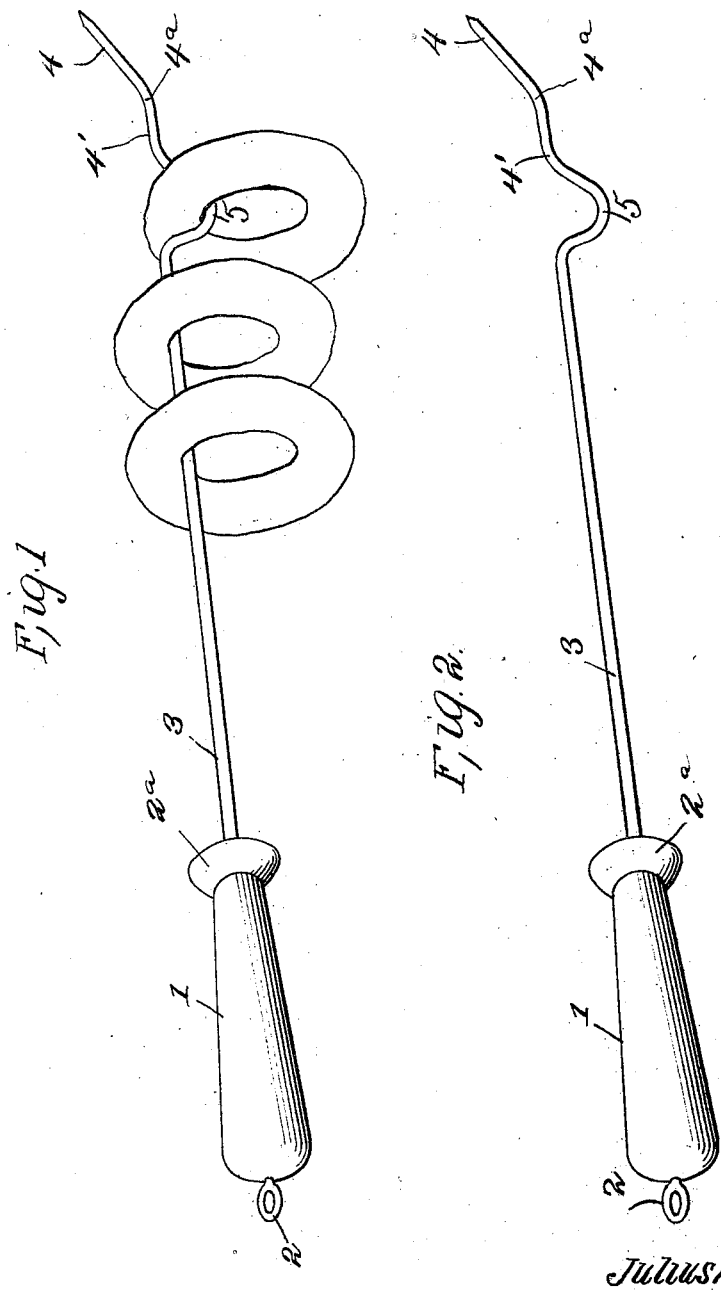

JULIUS A. RUND, OF BARTON, NORTH DAKOTA.

DOUGHNUT-LIFTER.

1,013,067.  Specification of Letters Patent.  Patented Dec. 26, 1911.

Application filed May 11, 1910. Serial No. 560,657.

*To all whom it may concern:*

Be it known that I, JULIUS A. RUND, a citizen of the United States, residing at Barton, in the county of Pierce and State of North Dakota, have invented new and useful Improvements in Doughnut-Lifters, of which the following is a specification.

This invention relates to new and useful improvements in doughnut lifters, the object of the invention being to provide a device wherein the doughnuts can be lifted from the boiling grease and thoroughly drained before they are finally deposited into a receptacle wherein they are to be stored, the device being constructed with a view of preventing the hot grease from splashing onto the hand of the user of the device in transferring the doughnuts thereto, and with this end in view the device is provided at one end with a scooping and lifting element which is curved directly into a longitudinal support, the angle at the point of connection of the scooping element with the support serving as a retainer to support the doughnut when lifting it from the pan without lowering the handle end of the device below the lifting end or scooping element.

In the drawing, forming a portion of this specification and in which like numerals of reference indicate similar parts in the several views:—Figure 1 is a perspective view of the doughnut lifter showing a series of doughnuts thereon. Fig. 2 is a similar view with the doughnuts omitted.

The device embodies a longitudinal support 3 which is relatively long being connected at one of its ends with a handle 1. The handle is provided at the end which is connected with the support with a stop 2ª. At the opposite end, the handle is provided with a suitable eye 2 by means of which the device may be hung upon a suitable support. A combined lifting and scooping element 4 is located immediately at the forward end of the support and it is connected therewith through the portions 4' and 5, the latter being in the form of a substantially semi-circular loop and is designed to serve the purpose of a retainer to be hereinafter described. The combined lifting and scooping element 4 is arranged substantially at an obtuse angle with respect to the support 3 and through such inclination of parts, a bend 4ª is formed providing a supplemental retainer in advance of the retainer 5.

The front end of the retaining and scooping element 4 is pointed, as shown, to facilitate the engagement of the scooping portion with the doughnut. It is described that the said combined scooping and lifting portion 4 is arranged substantially at an obtuse angle with respect to the support 3 and in practice, when the device is being used it is manipulated so as to cause the combined scooping and lifting portion 4 to lie substantially in a horizontal plane with respect to the bottom of the utensil in which the doughnuts are being cooked. This is extremely desirable in that the support 3 extends upwardly and outwardly away from the utensil sufficiently to prevent the hand of the user of the device from being subjected to steam of the boiling grease, however, the principal advantage in arranging the said combined scooping and lifting portion at the described angle with respect to the support is to provide means whereby upon slightly lowering the handle end of the device after the scooping portion is correctly positioned beneath the doughnut, the said handle portion may be lowered to a very slight extent so as to cause the lifting and scooping portion to extend upwardly at an angle with respect to the bottom of the utensil and to cause the doughnut which has been lifted to fall into the retainer 4ª at the point of connection of the scooping element with the support. The device is then held over the utensil for a time sufficient to permit the doughnut to be thoroughly drained, after which the device is manipulated to cause the doughnut to become lodged in the retaining loop 5. This permits the device to be repeatedly used and from the construction described a number of doughnuts can be threaded onto the support 3, the last doughnut being confined in the retaining loop 5 to hold the preceding doughnut against working off of the support. The stop 2ª at the forward end of the handle prevents the doughnuts in careless manipulation of the device from contacting with the hand of the user of the device.

I claim:—

1. As a new article of manufacture, a doughnut lifter comprising a single supporting member formed at one end to provide a combined scooping and lifting element which extends substantially at an obtuse angle to the support, a retainer forming a part of the support and located immediately adjacent to the said scooping and lifting element, and a handle at the opposite end of the support.

2. As a new article of manufacture, a doughnut lifter comprising a single relatively long supporting member formed at one end to provide a pointed scooping and lifting element which extends out of the plane of the remaining portion of the supporting member, the said supporting member having a retaining portion thereon located immediately adjacent to the said scooping and lifting element and having an inner surface of substantially semicircular form having portions extending in opposite directions from each other and extended directly into the surfaces of the support and scooping element respectively, and a handle at the opposite end of the support.

In testimony whereof I affix my signature in presence of two witnesses.

JULIUS A. RUND.

Witnesses:
C. H. B. GUNDERSON,
JOHN BRUSVEN.